United States Patent Office 3,684,486
Patented Aug. 15, 1972

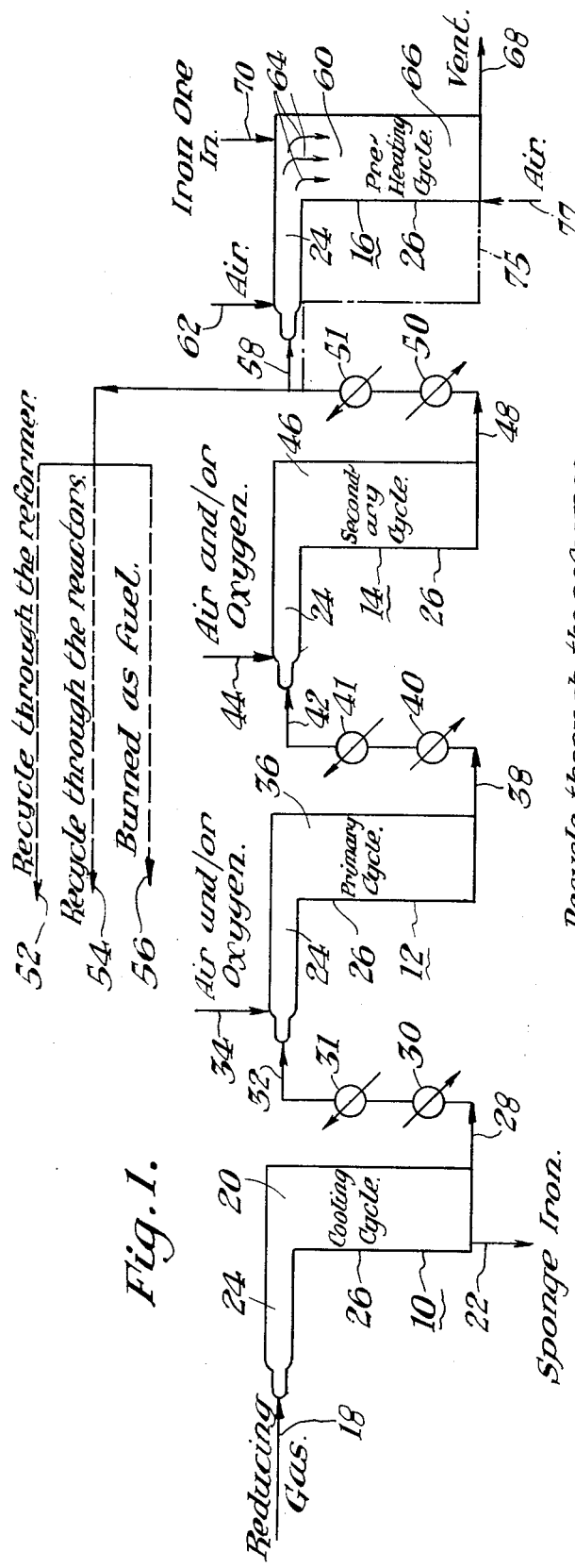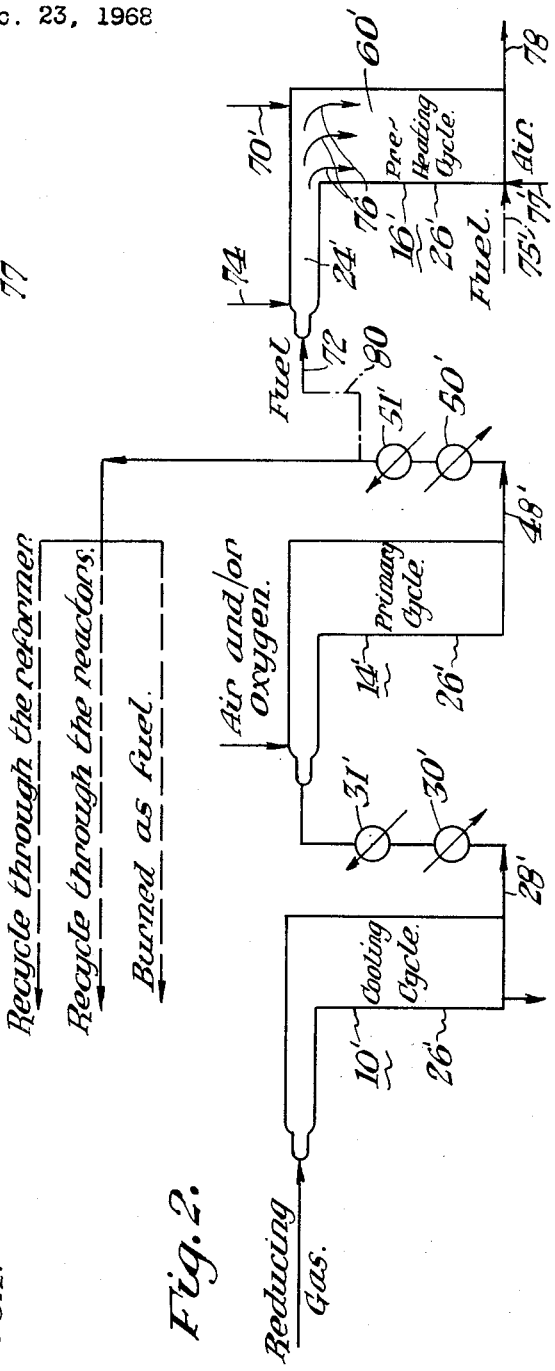

3,684,486
DIRECT REDUCTION OF IRON ORE AND THE LIKE
Mohamed A. Osman, Pittsburgh, Pa., assignor to Pullman Incorporated, as represented by its Swindell-Dressler Company Division, Pittsburgh, Pa.
Filed Dec. 23, 1968, Ser. No. 786,315
Int. Cl. C21b 13/14
U.S. Cl. 75—34    13 Claims

ABSTRACT OF THE DISCLOSURE

I disclose a method for the production of sponge metal, said method comprising the steps of placing a predetermined quantity of an oxidic ore of said metal in a reductional zone, preheating said ore with non-reducing gas, and passing a quantity of hot reducing gas through said ore to reduce said ore to said sponge metal.

---

The present invention relates to the direct reduction of iron ore and similar minerals, and more particularly to the productioin of metallic sponge with minimum disintegration and fuel consumption.

Although the invention is described primarily in connection with the direct reduction of iron ore, it will be apparent as this description proceeds that the disclosure is adaptable to the direct reduction of related minerals and other materials.

In recent years the direct reduction of iron ores has become economically feasible, and the state of the art and the number of proposals for effecting direct reduction have improved correspondingly. In the metallurgical industry, the term "direct reduction" is generally construed to denote those ore reduction processes which do not involve use of the blast furnace. That is to say, gaseous reducting materials are employed but without melting the produced iron sponge to pig iron.

A large number of direct reductional methods for producing sponge iron or similar products have been patented over the years. The investigation of direct reduction of iron oxides with reducing gases (mainly $H_2$ and CO) began in the mid-19th Century. For example, Debray [Debray, M. H., Compt. Rend. 45, 1018–1020 (1857)] investigated iron ore reduction with CO. Debray's experiments were conducted with a solid-gas direct reduction, although the main purpose was to investigate blast furnace performance. Typical of subsequent investigations are the following references:

Wiberg, F. M., Jerkontorets Ann. 124, 179 (1940)
Edstrom, J. D.; J. Iron and Steel Inst., 175,289 (1953)
Specht, O. G. and Zapffe, A. G.; Trans, AIME, 167, 237, (1946)
Osman, M. A.; Manning, F. S.; and Philbrook, W. O.; AIChE, 12,685 (1965)
Chang, M. C.; Blast Furn. and Steel Plant, 1019 (1967)
Schmidt, C. R.; Contribution to a Tech. Meeting at Jernkontoret, Stockholm, (March 1952)
Falk, C. E.; "Sponge Iron in Swedish Steel Making," paper presented at "The International Congress for the Production & Utilization of Pre-reduced Minerals;" Evian, France (1967)

Almost all of the literature references report cracking or splitting of the oxide particles upon reduction. The formation of a "semi-permeable membrane" of metallic iron about the particles permits the reducing gas to diffuse inwardly, but impedes outward diffusion of reaction product. Wiberg shows that the "Pocket Pressure" of the entrapped water vapor can be 63% higher than the gas stream pressure, upon reduction by $H_2$. With CO as the reducing agent, the pocket pressure under the same conditions, may be as much as 4,000% higher than the gas stream pressure. Naturally, the contained gaseous products will burst through the metallic shell causing cracks that facilitate further reduction of the ore but at the same time promote the disintegration of the sponge iron thus produced.

Moreover, owing to the crystallographic transformation resulting in specific volume changes, pores form during the course of reduction of the iron ore to metallic sponge iron. This extensive formation of pores and the breaking up of the structure during reduction facilitates the continued reduction of the charge by enlargement of the surfaces available for contact by the reducing gases. Such phenomena, however, tend to produce a weak sponge iron that may easily disintegrate upon handling.

One of the more recent processes and, perhaps, the most successful to date is the process described in the United States patent to Juan Celada, No. 2,900,247. The Celada arrangement uses reformed natural gas, comprising $H_2$, CO, $CO_2$ to reduce iron ore lumps in a suitably shaped reactional vessel. Although this process has been successful in the production of a sponge iron having a relatively high metallic content (circa 85%), the sponge iron so produced is prone to disintegration upon removal from the vessel. The resulting fines interfere with subsequent processing of the sponge iron, e.g. during handling and in an electric furnace, as the fines are blown away. The fine material lost in this manner represents lost production or entails considerable expenditures to recover the fines from flues and the like.

It has been also found that the Celada process consumes considerable quantities of fuel for the direct reduction of the ore. For example, a tone of ore processed in this manner requires from 50,000–60,000 standard cubic feet of reformer gas depending on the kind of ore.

The United States patents to Keith et al. No. 3,288,590; Osborn No. 2,831,759 and Agarwal No. 2,996,373 also are of interest. In the Agarwell process both the reducing gas and the ore are preheated to supply the necessary heat for the endothermic reductional reaction. As the iron ore particles, in each of the three reduction zones, are fluidized, there obviously is no teaching of preheating for purposes of increasing the strength of a sponge iron product. "Sticking" of the metallic particles are purposefully avoided. Moreover, there is no disclosure of preheating with a separate, non-reducing gas. The same considerations apply to Keith et al. and to Osborn.

Juan Celada No. 3,128,174 is an improvement upon the previously mentioned Celada patent in that the streams of reducing gas and combustion air are separately preheated. Again, there is no disclosure of preheating with a separate non-reducing gas.

Other direct reduction processes, as typified by the U.S. patent to Kuzell et al. No. 3,125,439, utilize spent or off-gas from the reduction chamber to preheat a subsequent charge of ore. As the off-gas is not completely spent, the Kuzell et al. process likewise does not employ a separate, non-reducing gas for preheating purposes.

Heitmann et al. No. 3,219,436 eliminates the heat-hardening of green pellets for direct reduction processes. The pellets, which contain ten to twenty percent solid fuel and considerable moisture, are introduced immediately into the preheating zone of the furnace. The preheating procedure is not disclosed, and apparently a frangible product results, as the reduced pellets are readily crushed to iron dust.

Thomsen No. 3,052,533 utilizes spent reductional gases for operating a turbine to energize an electric furnace for subsequent processing of directly reduced iron and in turn utilizes the waste turbine gases for a reforming operation.

The U.S. patent to Brown No. Re. 19,770 is another direct reductional process where the production of sponge iron is avoided. The Brown process is devoted to the production of non-adherent metallic iron particles. The waste gas from the reductional process is used to preheat both combustion air and a natural gas fuel which is reformed.

In the remaining patents of which I am aware, such as the U.S. patents to Collin et al. Nos. 3,150,958 and 3,163,520; Wendt, Jr., et al. No. 3,332,770; Collin No. 3,224,871; Parry No. 2,470,106; and Kuzmick et al. No. 2,759,808, although they can be considered direct reduction processers, part or all of the fuel is solid material, usually mixed with the ore and briquetted. Where preheating is provided, spent heating or reductional gases are used. There is no disclosure of a separate non-reducing gas preheating step, and a high carbon iron is produced similar to a blast furnace product.

I have discovered that dusting or disintegration of the sponge iron can be largely overcome by subjecting the iron ore and the sponge iron to a carefully controlled heating pattern. Moreover, the nature of the heating gases, the reductional temperatures, the type of ore and the degree of direct reduction affect, in a combined and rather complex manner, the strength of the sponge iron produced. As reductional temperatures increase, higher reductional temperatures yield a stronger sponge up to a point and thereafter the resulting sponge becomes increasingly subject to smelting and fusion. Coinciding with the initial improvement in increasing reductional temperatures, I have found that preheating of the ore in an inert, rather than a reducing atmosphere, produces a stronger sponge which is less prone to disintegration on handling. An oxidizing atmosphere can be used with approximately equivalent beneficial results, particularly where the ore contains impurities such as sulfur which are oxidized and removed as gaseous materials. On the other hand, certain conventional separate ore pretreating procedures, such as roasting where the ore is heated and then cooled prior to the reduction process decrease rather than increase the relative strength of the resulting sponge iron. Other considerations affect sponge iron strength and include reducing gas composition and flow rate, reductional time, rate of heating and cooling the iron ore and the resulting sponge, and methods of removing the sponge iron from the reactional vessel.

I accomplish the desirable results by providing a method for the production of sponge metal, said method comprising the steps of placing a predetermined quantity of an oxidic ore of said metal in a reductional zone, preheating said ore with non-reducing gas, and passing a quantity of hot reducing gas through said ore to reduce said ore to said sponge metal.

I also desirably provide a similar direct reductional method wherein said preheating step is modified by first combusting a portion of said reducing gas with at least a stoichiometric quantity of combustion air after passing through said zone to produce said non-reducing preheating gas.

I also desirably provide a similar direct reductional method including the step of adding excess combustion air to produce an oxidizing preheating gas.

I also desirably provide a similar direct reductional method including the additional step of heating said preheating gas to a maximum temperature of about 1300° C.

I also desirably provide a similar direct reductional method including the modified step of preheating said ore with said preheating gases until the temperature of said ore adjacent the outlet for said gases attains a temperature in the range of 700°–950° C.

I also desirably provide a similar direct reductional method including the additional step of limiting the minimum temperature of said ore adjacent the outlet for reducing gas during said reducing step to about 700–900° C.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 1 is a schematic flow diagram illustrating one form of preheating and direct reductional method arranged in accordance with my invention;

FIG. 2 is a similar diagram of a modification of my novel direct reductional method.

Referring now more particularly to FIG. 1, a stepwise reductional process is illustrated. Although the process can be carried out in a single reactional vessel, a plurality of such vessels 10, 12, 14 and 16 desirably are used representing differing stages of the process to permit continuous flows of the preheating and reductional gases. The reactional vessels are arranged spatially in the order of gas flow therethrough. The sequence in which a batch in a given one of the reactional vessels is subjected to these gas flows and to charging and discharging operations is indicated by the cardinal numbers in parentheses directly below each of the reactional vessels 10–16.

In consequence I shall describe my process for producing sponge iron in terms of sequential gas flows with the realization, of course, that a given charge of iron ore remains in situ in a given one of the reactional vessels 10–16, while a group of such vessels are variously subjected to the sequential gas flows. I shall describe my novel process, then, in terms of the several and successive gas flows among the reactional vessels 10–16.

From a conventional reformer (not shown) reducing gas (arrow 18) is introduced into the reactional vessel 10, after the contents thereof have been subjected to preheating and reducing gas flows. This final treatment cools the sponge iron 20 contained within the reactional vessel 10, after which the sponge iron is removed from the vessel 10 (arrow 22). The collapsible drill mechanism disclosed in a copending, coassigned application of E. D. Dowling entitled "Drill Mechanism for Sponge Iron Reactors and the Like," Ser. No. 660,364, filed Aug. 14, 1967, now U.S. Patent 3,496,387, can be used for this purpose.

In this example, flow of the cooling gases through the reactional vessel 10 is from top to bottom although the opposite flow direction can be utilized. Thus, the reducing gases are introduced normally into firing chamber 24 of the reactional vessel from which the gases flow downwardly through the charge-containing chamber or shaft 26 of the reactional vessel.

As the charge 20 of vessel 10 contains considerable sensible heat imparted thereto in the previous "primary cycle" reductional step a certain amount of residual iron oxide is reduced in the cooling stage represented by the reactional vessel 10. The reducing gases 18 are, of course, preheated by the hot sponge iron in the vessel 10. The reducing gases exit from the bottom of the vessel 10 (arrow 28) and are conducted thence to a gas quenching or cooling tank 30 of conventional construction. The purpose of the cooling tank 30 is to reduce the temperature of the reducing gas to the point where the superheated steam contained therein can be condensed and removed as water. Saturated reducing gas at ambient temperature is thereby supplied to the succeeding reactional vessel after being heated in a conventional furnace 31. The quench tanks 40, 50 and furnaces 41, 51 mentioned below provide similar functions.

From the quench tank 30 the cooled and saturated reducing gases are heated in the furnace 31 to 700–900° C. and conducted (arrow 32) to the combustion chamber 24 of the succeeding reactional vessel 12. A small proportion of the gases 32 are combusted with air or oxygen (arrow 34) likewise supplied to the combustion chamber 24 of vessel 12, in an amount sufficient to raise the temperature of the reducing gas to the desired level. This partial combustion with air and/or $O_2$ of the reducing gases can be eliminated in certain cases by preheating the ore high enough with the preheating, non-reducing gas (1100–1300° C. at the gas inlet and 700–900° C. at gas outlet) and by preheating the reducing gas in a separate furnace (not shown) to a suitable temperature (up to 1000° C.) depending on equipment considerations and type of ore.

After partially reducing charge 36 of the vessel 12, the partially spent reducing gases (arrow 38) are conducted through cooler 40, furnace 41, and supplied to the combustion chamber 24 of the succeeding reactional vessel 14. Here again air and/or oxygen (arrow 44) is added in sufficient quantity to the combustion chamber 24 of vessel 14 for the controlled insufficient combustion of the reducing gases 42 to raise the temperature. The flows of reducing gases 32, 42 after partial combustion with air and/or oxygen have a temperature of about 1300° C. at their initial contact with the charges 36, 46 and are regulated to produce a maximum temperature of 900°–1000° C. in the midpoints of the charges and 800°–900° C. at the gas exits.

The process could work in some cases without the addition of air and/or $O_2$ partial combustion, i.e., hot gases from the preheating furnaces can directly be led to the charge at about 900°–1000° C.

With the arrangement thus far described I have developed an essentially two stage direct reductional process (reactional vessels 12, 14) with residual reduction in the cooling stage of reactional vessel 10. Thus, in the secondary reductional stage (vessel 14), relative to reducing gas flow, the iron ore is reduced to about 30–40% of metallic iron. In the primary reductional stage (vessel 12) the metallic iron content is increased to about 70–80%. The final product issuing from vessel 10 (arrow 22) is endowed with a metallic iron content of 80–90%. Most importantly, and as described in greater detail hereinafter, the reductional temperatures are limited to aid in the avoidance of cracking and disintegration of the sponge iron thus produced. I have found that these temperatures can be so limited owing primarily to the use of the novel preheating steps of my invention. In contrast, it has previously been considered essential to utilize as high a reductional temperature as possible within the limitations of the equipment, except in known fluidized process where sticking of the particles must be avoided.

The volumes and flow rates of the several aforenoted reducing gas and combustion air and/or oxygen flows will depend on the size of the respective reactional vessels, the quantity and type of ore therein, particular reaction temperatures, and the like. Such volumes and flow rates, therefore, can readily be calculated for each of the reactional vessels 10–16 within the guidelines of my disclosure.

The spent reducing gases for the secondary reductional stage (vessel 14) are withdrawn from the bottom of the vessel (arrow 48) to a third cooling tank 50 for the purposes mentioned previously. The cooled effluent (arrow 51) still contains significant quantities of reducing gases and can be recycled through the direct reductional process of FIG. 1, either through the aforementioned reformer or through one or more of the reactional vessels 10, 12 or 14 (arrows 52, 54). Alternatively, the off gases can be burned as fuel in an external process (arrow 56).

In accordance with the invention a portion of the off gases (arrow 58) is introduced into the combustion chamber 24 of the reactional vessel 16 for preheating the iron ore charge 60 loaded (arrow 70) into the shaft portion 26 of the vessel 16. Logically, one would utilize the sensible heat remaining in the effluent gases (arrow 48) of the vessel 14 for preheating and partially reducing charge 60 in the vessel 16. However, such use not only requires a greater total quantity of reducing gas for the overall reductional process but also increases the disintegrating tendency of the sponge iron when removed from vessel 10. On the other hand, I have found that an inert or oxidizing hot gas flow through the reactional vessel 16 decreases both the overall reductional time and the total requirement in reducing gas. Most importantly, an iron sponge is produced which is not prone to disintegration and which can be handled without difficulty in subsequent refining operations.

In accordance with the FIG. 1 modification of my invention, I attain an inert or oxidizing preheating gas by burning a predetermined portion (arrow 58) of the off gases from vessel 14 (arrow 51) with either a stoichiometric or excess quantity of air (arrow 62) in the combustion chamber 24 of the preheat vessel 16. The inert or oxidizing hot combustion products (arrow 64) then flow through the charge 16 to preheat the charge without reduction of any part thereof to the free metal.

The combustion temperature in chamber 24 of vessel 16 preferably is regulated so that the temperature ranges upwardly to 1300° C. depending upon the type of iron ore used. During the preheating cycle the temperature of the iron ore 66 adjacent the gas vent 68 should lie in a temperature range of 700–950° C. depending again on the ore used, before the subsequent reductional step is initiated (vessel 14). In general and within the limits of the apparatus, the higher the exit gas temperature reached in the preheating cycle (vessel 16), the stronger the sponge iron produced and the shorter the overall reducing gas flow through the process is adequate to supply the preheating gas portion 58 and at least any necessarily recycled reducing gas (arrows 52, 54). If process gas is not enough for recycling and heating, preheating can be achieved by combustion of added gaseous or liquid fuel with stoichiometric or excess air to produce the necessary hot inert or oxidizing gases. I have found that use of the preheating cycle (vessel 16) decreases the thermal consumption per ton of the sponge iron product.

Insofar as the aforementioned beneficial results of the preheating gas of 64 in vessel 16 are concerned, it matters little whether the gases of 64 are inert or are oxidizing in character. For those ores containing sulfur, however, the combustion air 62 supplied to the vessel 16 is adjusted to provide oxidizing gases 64. These gases then unite with the sulfur content of the ore to drive off the sulfur in gaseous form and to eliminate the conventional ore-roasting procedure conventionally employed for sulfur-bearing iron ores. Besides the obvious advantages of eliminating the preliminary ore-roasting step, use of an oxidizing preheating cycle unexpectedly increases the strength of the sponge iron product as mentioned previously. In contrast, I have found that use of a separate conventional and preliminary ore-roasting step renders the resulting sponge iron more prone to disintegration.

It will be understood of course that the reactional vessels 10–16 can be equipped with the necessary installations such that the hot inert or oxidizing gases thereof communicate with the bottom of the charge shaft 26, as shown in FIG. 2 with reference to reactional vessel 16'.

Although the preheating gases can flow downwards or even better, upwards through the one charge; the reducing gases of the secondary, primary and cooling cycles should flow from the top down to prevent fusion of the one at the bottom by high temperature reduction of the charge. Alterative upward flows of preheating gases are denoted by conduits 75, 75' connected to bottoms of the vessels 16, 16' in FIGS. 1 and 2. Combustion air can be supplied at the same locations as denoted by conduits 77, 77'.

The process of FIG. 2 can utilize part of the off gases 58 or any suitable gaseous or liquid fuel (arrow 72) to supply the aforementioned inert or oxidizing preheating gases when burned with appropriate quantity of combustion air (arrow 74). The hot gases 76 are then flowed upwardly through the charge 60' for the purposes mentioned previously. The preheating gases exit from a vent structure (arrow 78). The upward flow of preheating gases 75 or 75' is desirable in the respect that the bottom part of the bed will heat up faster and thus shorten both the heating and reduction cycles. Preheating gas flows in others of the reactional vessels 10–16 of FIG. 1 or 10' and 14' of FIG. 2 can be similarly directed.

Alternatively, a portion of the spent reducing gases (arrow 48) can be admitted to the combustion chamber 24' as denoted by chain outlined conduit connections 80. It is also contemplated that the external fuel 72, for example natural gas, can be introduced to the upper end of the reactional vessel 16 of FIG. 1 in place of the residual reducing gas portion 58. Although the necessary preheat for vessel 16 (FIG. 1) or 16' (FIG. 2) is conveniently supplied by burning a suitable fuel gas, it is contemplated that an externally heated inert gas, such as nitrogen, or a suitable oxidizing gas can be supplied to the vessel without combustion within the vessel 16 or 16'. For example waste flue gases from unrelated processes can be utilized, providing the fuel is completely combusted and the gases are at the right temperature. An other means for producing hot inert or oxidizing gases can be likewise substituted. For example, a solid or gaseous fuel can be burned in an external chamber and then introduced to the reactional vessel 16' or 16. It follows that any combination of these sources of hot inert or oxidizing gases can likewise be used.

FIG. 2 also shows that the principal reduction cycle can be carried out in a single reactional vessel such as the vessel 14'. The reduction of the ore thus becomes essentially a one-step process. The heating shaft 26' of the vessel 14' can be lengthened or the flow rate of reducing gases can be correspondingly reduced to provide the increased contact time necessary in a single reduction zone. In other applications, an additional reactional vessel (not shown) similar to the vessel 12 or 14 can be added to provide a three-step reduction of the ore.

Tests of the aforedescribed processes have yielded a sponge iron product with improved strength and have reduced considerably the fines produced during removal and subsequent handling operations. The thermal consumption and cycle time per ton of sponge iron is also lessened. In consequence the production of sponge iron can be significantly increased and at the same time a more evenly metallized sponge iron is obtained.

From the foregoing it will be apparent that novel and efficient forms a direct reduction of iron ore and the like have been described herein. While I have shown and described certain presently preferred embodiments of the invention and have illustrated presently preferred methods of practicing the same it is to be distinctly understood that the invention is not limited thereto but may be otherwise variously embodied and practiced within the scope of the following claims.

I claim:
1. A method for the production of sponge metal, said method comprising the steps of placing a predetermined quantity of an oxidic ore of said metal in a reductional zone, first preheating said ore with hot oxygen-bearing non-reducing gas, and then passing a quantity of hot reducing gas through said ore to reduce said ore to said sponge metal.

2. The method according to claim 1 wherein said preheating step is modified by first combusting a portion of said reducing gas, with at least stoichiometric quantity of combustion air after passing through said zone to produce said non-reducing preheating gas.

3. The method according to claim 2 including the step of adding excess combustion air to produce an oxidizing preheating gas.

4. A method according to claim 1 comprising the additional step of dividing said direct reduction zone into at least two reduction areas for stagewise reduction of said ore.

5. The method according to claim 1 including the additional step of cooling a preceding quantity of reduced ore with said reducing gas before said direct reductional step.

6. The method according to claim 1 comprising the additional step of burning fuel with at least a stoichiometric quantity of combustion air to obtain said non-reducing preheating gas.

7. The method according to claim 1 including the additional step of heating said preheating gas to a maximum temperature of about 1300° C.

8. The method according to claim 7 including the modified step of preheating said ore with said preheating gases until the temperature of said ore adjacent the outlet for said gases attains a temperature in the range of 700–950° C.

9. The method according to claim 1 including the additional step of limiting the minimum temperature of said ore adjacent the outlet for reducing gas during said reducing step to about 700–900° C.

10. The method according to claim 1 including the additional steps of preheating said reducing gas adjacent said zone by burning a portion thereof with less than a stoichiometric quantity of combustion air and/or oxygen.

11. The method according to claim 10 including the additional step of cooling said reducing gas prior to conveying said gas to said areas.

12. The method according to claim 10 including the additional step of preheating said reducing gas to a temperature in the range of 700–800° C.

13. The method according to claim 1 including the additional steps of preheating said ore with said non-reducing gas to a temperature in the range of 1100–1300° C. at the gas inlet of said zone and of 700–900° C. at the gas outlet of said zone, and preheating said reducing gas to a maximum temperature of about 1000° C.

References Cited
UNITED STATES PATENTS

| | | | |
|---|---|---|---|
| 1,983,604 | 12/1934 | Flannery | 75—38 X |
| 2,107,980 | 2/1938 | Elian | 75—38 |
| 3,163,521 | 12/1964 | Rinesch | 75—38 X |
| 3,428,445 | 2/1969 | Rausch | 75—33 X |
| 3,497,348 | 2/1970 | Rausch | 75—33 |
| 3,551,138 | 12/1970 | Brown | 75—34 X |
| 3,562,780 | 2/1971 | Eisenberg | 75—34 X |
| 3,532,489 | 10/1970 | Wienert | 75—34X |

FOREIGN PATENTS

| | | | |
|---|---|---|---|
| 890,282 | 2/1962 | Great Britian | 75—60 |

L. DEWAYNE RUTLEDGE, Primary Examiner

J. E. LEGRU, Assistant Examiner

U.S. Cl. X.R.

75—36